United States Patent [19]

Stabel et al.

[11] Patent Number: 5,731,483
[45] Date of Patent: Mar. 24, 1998

[54] RECYCLING OF PLASTICS IN A STEAM CRACKER

[75] Inventors: Uwe Stabel, Edingen-Neckarhausen; Helmut Woerz, Mannheim; Ruediger Kotkamp, Limburgerhof; Andreas Fried, Bobenheim-Roxheim, all of Germany

[73] Assignee: BASF Aktiengesellschaft, Ludwigshafen, Germany

[21] Appl. No.: 553,658

[22] PCT Filed: May 20, 1994

[86] PCT No.: PCT/EP94/01647

§ 371 Date: Nov. 17, 1995

§ 102(e) Date: Nov. 17, 1995

[87] PCT Pub. No.: WO95/03375

PCT Pub. Date: Feb. 2, 1995

[30] Foreign Application Priority Data

Jul. 20, 1993 [DE] Germany .................. 43 24 112.3
Jan. 10, 1994 [DE] Germany .................. 44 00 366.8

[51] Int. Cl.⁶ .................. C07C 1/00; C07C 4/22
[52] U.S. Cl. .................. 585/241; 585/648; 208/130
[58] Field of Search .................. 585/241, 648; 208/130

[56] References Cited

U.S. PATENT DOCUMENTS 5,364,995  11/1994  Kirkwood et al. .................. 585/241

FOREIGN PATENT DOCUMENTS

| 2108968 | 9/1983 | Canada . |
| 2094456 | 10/1993 | Canada . |
| 502 618 | 9/1992 | European Pat. Off. . |
| 567 292 | 10/1993 | European Pat. Off. . |
| WO93/18112 | 9/1993 | WIPO . |

*Primary Examiner*—Glenn Caldarola
*Assistant Examiner*—Bekir L. Yildirim
*Attorney, Agent, or Firm*—Keil & Weinkauf

[57] ABSTRACT

A process for recycling plastic waste in a steam cracker, wherein a melt obtained from plastic waste is converted into products at from 400° 550° C., and a distillate fraction is separated off from the products at from 180° to 280° C. and is fed as feed material to a steam cracker.

9 Claims, 2 Drawing Sheets

RECYCLING OF PLASTICS IN A STEAM CRACKER

This application is a 371 of PCT/EP94/01647 filed on Sep. 20, 1994.

The present invention relates to a process for recycling plastics in a steam cracker.

It is possible by means of the process according to the invention to convert plastics, for example pure polymeric plastic waste, mixed plastic waste or sheet waste, including possible soiling, sticky label materials, fillers, residual contents etc., into high-value feed materials for the known steam cracking process. These feed materials are in turn converted in the known steam cracking process, into cracked products such as ethylene, propylene, $C_4$ mixtures, pyrolysis gasoline etc., and these are produced in yields which are almost the same as or even higher than when the steam cracker is operated with the traditional feed materials such as naphtha, liquid petroleum gas (LPG) and gas oil. It is therefore possible by means of the process according to the invention to replace in the steam cracking process the abovementioned traditional feed materials by feed materials obtained from plastic waste, it being unnecessary to admix naphtha, LPG or gas oil with the feed materials obtained from plastic waste.

The process according to the invention therefore makes a considerable contribution to the economic recycling of plastics.

The known steam cracking process is usually understood as evaporation and heating of the feed materials at up to 650° C. with subsequent treatment at in general from 700° to 1100° C., for example from 780° to 860° C., in the course of, usually, from 0.02 to 10, for example from 0.1 to 2, seconds in the presence of steam.

It is known that the plastic wastes obtained as garbage consist of about 70% by weight of polyolefins, such as polyethylene and polypropylene, about 15% by weight of styrene polymers, about 10% by weight of PVC and minor amounts of about 5% by weight of other plastics, such as polyurethane, polyester and polyamide. These plastic wastes are generally soiled, ie. they also contain sticky label materials, fillers, residual contents, etc. The plastic wastes are usually sorted and are therefore obtained in various fractions known per se. The bottle or blow molded fraction composed of bottles, containers, etc., which essentially consist of polyolefins, such as polyethylene or polypropylene, a mixed plastic fraction, consisting essentially of polyethelene (PE), polypropylene (PP), styrene polymer, such as polystyrene (PS), and polyvinyl chloride (PVC); a sheet fraction consisting essentially of PE and PP, etc., and a light fraction consisting essentially of PE, PP and PS, in each case possibly with adherent soiling, sticky label materials, fillers, residual contents, etc., may be mentioned. Essentially, the fractions contain plastics other than the stated ones only in minor amounts, for example less than 10% by weight, in many cases less than 5% by weight, in particular less than 2% by weight.

A number of processes have been described in the patent literature for converting plastic waste into products for further processing, for example catalytic or thermal processes, hydrocracking processes, extrusion processes etc. For example, Europ. Patent Application 0 502 618 describes a process in which plastic waste, specifically polyolefins, is converted into lower hydrocarbons. This entails the plastic waste being reacted in a fluidized bed apparatus at about 300°–630° C. The resulting lower hydrocarbons, such as paraffins or waxes, can be converted by means of the known steam cracking process into olefins. Plastic waste can be converted by the combination of fluidized bed apparatus and known steam cracking process into these olefins.

An evident disadvantage of this process is that for the steam cracking process it is necessary to add naphtha to the feed materials obtained, ie. it is not possible to convert the plastic waste into cracked products such as ethylene, propylene etc. without adding traditional feed materials. Furthermore, the handling of the solids in the fluidized bed always proves to be a disadvantage. It is also problematic to scale up a process of this type to large-scale industrial operation.

Patent Application WO 93/18112 published on Sep. 16, 1993, describes a process for the preparation of olefins from plastic waste by establishing a desired viscosity by thermal pretreatment of the plastic waste at from 380° to 680° C. and subsequent thermal treatment of the product at from 700° to 1100° C. The process does not involve any distillative separation of the product. The process cannot produce a product which can be evaporated without leaving a residue.

It is an object of the present invention to provide a process which can be used industrially on a large scale and with which plastic waste is converted into high-value feed materials for a steam cracker which may be available, so that these feed materials can be converted, without the addition of, for example, naphtha, LPG and gas oil, in the steam cracking process into cracked products such as ethylene, propylene, $C_4$ mixtures and pyrolysis gasoline in high yield.

We have found that this object is achieved if a melt obtained from plastic waste is converted into products at from 400° to 550° C., a distillate fraction being separated off from the products at from 180° to 280° C., preferably from 220° to 260° C., in particular from 230° to 250° C., and said fraction is fed as a feed material to a steam cracker.

In an advantageous embodiment of the process, the plastic waste is melted, in general at from 280° to 380° C., the melt is fed to a reactor where the polymers are converted at from 400° to 550° C. into products which can be evaporated and cracked in a conventional way in the steam cracker, a distillate fraction is separated by distillation, at from 200° to 280° C., preferably from 220° to 260° C., in particular from 230° to 250° C., from the products, the other products are returned to the reactor, with the exception of residues and solids and any inorganic acids and possibly aromatics, and the distillate fraction separated off is introduced, if necessary after further separation, as a feed material into the steam cracker.

In some cases, it has proven advantageous to separate off aromatics, such as ethyl benzene and styrene, from the distillate fraction before it is used in the steam cracker. This can be done by known methods, such as extraction or distillation. The aromatics can then be used separately, for example added directly to the aromatics fraction (pyrolysis gasoline) of the products of the steam cracker.

The process is advantageously used for blow molded fractions and sheet fractions. Melting of the plastic waste is preferably carried out at from 280° to 350° C., in some cases at from 300° to 350° C., in particular from 290° to 320°, and the conversion in the reactor at from 400° to 450° C.

The distillate fraction or fractions is or are preferably separated off by a process in which the products are separated by means of a 1st column which is directly downstream of the tubular furnace into a bottom product resulting at from 300° to 420° C., in particular from 330° to 380° C., which, after removal of the residues and solids, is returned to the reactor, and into a top product resulting at from 200° to 280°, preferably from 220° to 260°C., in particular from 230° to 250° C., which, after partial condensation, is fed into a 2nd column at 70° to 150° C., in particular from 100° to 120° C., the liquid/gas mixture resulting after the partial condensation is separated by means of the above 2nd column into a liquid mixture emerging, in general at from 50° to 100° C., at the bottom of the 2nd column, which is, on the one hand, returned to the 1st column and, on the other hand, used as feed material for the steam cracker, and into a gas mixture emerging, in general, at from 20° to 80° C., at the top of the 2nd column, which is used as feed material for the steam cracker.

If the plastic waste contains significant amounts, ie. usually more than 5% by weight, of chlorine-containing plastic, such as polyvinyl chloride, and/or aromatics-containing plastic, such as styrene polymer, as, for example, in a mixed plastic fraction, it has proven advantageous to melt the plastic waste at from 330° to 380° C., in particular from 320° to 350° C., the polyvinyl chloride simultaneously being dehydrohalogenated, and to carry out the conversion into products in the reactor at from 410° to 530° C., preferably from 420° to 480° C., in particular from 430° to 480° C. Said products can be evaporated and cracked in a conventional way in the steam cracker.

For the dehydrohalogenation, a residence time of from 1 hour to 20 hours is generally sufficient at the temperatures used. The time required depends on the desired degree of dehydrohalogenation and can be readily determined by a person skilled in the art by means of simple preliminary experiments. In some cases, particularly when the dehydrohalogenation is continued after the melting, for example at from 250° to 300° C., the desired residence time may be up to about 5 days. This can advantageously take place during temporary storage.

The distillate fraction is preferably separated off by a process in which the products are separated by means of a 1st column which is directly downstream of the reactor into a bottom product resulting at from 330° to 450° C., in particular from 350° to 400° C., which, after removal of the residues and solids, is returned to the reactor, and into a top product resulting at from 200° to 280° C., in particular from 230° to 250° C., which, after partial condensation, is fed to a 2nd column at from 70° to 150° C., in particular from 100° to 120° C., the liquid/gas mixture resulting after the partial condensation is separated by means of the above 2nd column into a liquid mixture emerging, in general at from 50° to 100° C., at the bottom of the 2nd column, which is, on the one hand, returned to the 1st column and, on the other hand, fed to a distillation or extraction unit suitable for removing aromatics, and into a gas mixture emerging, in general at from 20° to 80° C., at the top of the 2nd column, which is used as feed material for the steam cracker.

The liquid mixture fed to the above distillation or extraction unit is in general separated into a liquid fraction which is used as feed material for the steam cracker, and into an aromatic fraction.

The heat of condensation of the top product from the first column can be used for generating steam at various pressures.

The plastic waste can be melted in suitable apparatuses which ensure sufficient heat transfer and the required thorough mixing. The stirred container, such as stirred kettles or in particular intensively stirred kettles, which can be equipped with a heating jacket and/or internal heater has proven useful. The melting process is usually relatively rapid, ie. complete after from 0.5 to 30 minutes. Advantageously, for example, when dehydrohalogenation is being carried out, a plurality of these stirred containers, for example two or three, are operated in a cascade.

Conventional apparatuses, such as stirred containers or extruders, may be used as the reactor for converting the melt into products. A tubular furnace is advantageous. In many cases, it has proven advantageous if some of the reaction products leaving the tubular furnace are recycled to the tubular furnace to increase the residence time. In this procedure, the conversion to the products takes place partly in the recycle pipe used for this purpose, if necessary in a delay tank, depending on the temperature and residence time conditions. The tubular furnace is in general a heat exchanger in which heat is transferred from the gas phase present outside the pipes into the material, for example the melt, present in the pipes. A reformer, a coker, a refinery furnace or in particular a tubular cracker, as used, for example, in steam crackers, may advantageously be employed (cf. for example Ulmanns Encyklopädie der technischen Chemie, 4th edition, Volume 3, page 476 and pages 330/331).

The conversion into the products is advantageously carried out in the absence of air, for example under nitrogen, so that oxidation during the pyrolysis is avoided.

For the purposes of the present invention, residues and solids are materials which remain behind in the distillative separation and do not boil below 500° C., if they boil at all. These are, for example, impurities adhering to the plastic waste, paper residues, coking products, glass and metal residues, sand, pigment residues, fillers or the like.

In the novel process, it has proven advantageous to pass at least some of the bottom product of the first column as a heating medium through the heating jacket of the melting container before it is returned to the reactor. The average residence time in the reactor is usually from 0.05 to 10 hours.

The normal process is generally carried out at from 0.8 to 2.0 bar, preferably at atmospheric pressure, ie. 1 bar. The stated boiling point or boiling ranges are based on 1 bar.

The plastic waste can be used with or without drying. Depending on the dimensions of the melting unit and its feed apparatuses, it may be necessary to comminute the plastic waste by generally known methods, such as shredding or milling. Good results are obtained with average particle sizes of from 2 to 10 mm. Particle sizes of from 1 to 10 cm and in some cases also uncomminuted plastic waste are also suitable.

The dependent claims relate to other features of the process according to the invention.

Figure 1:
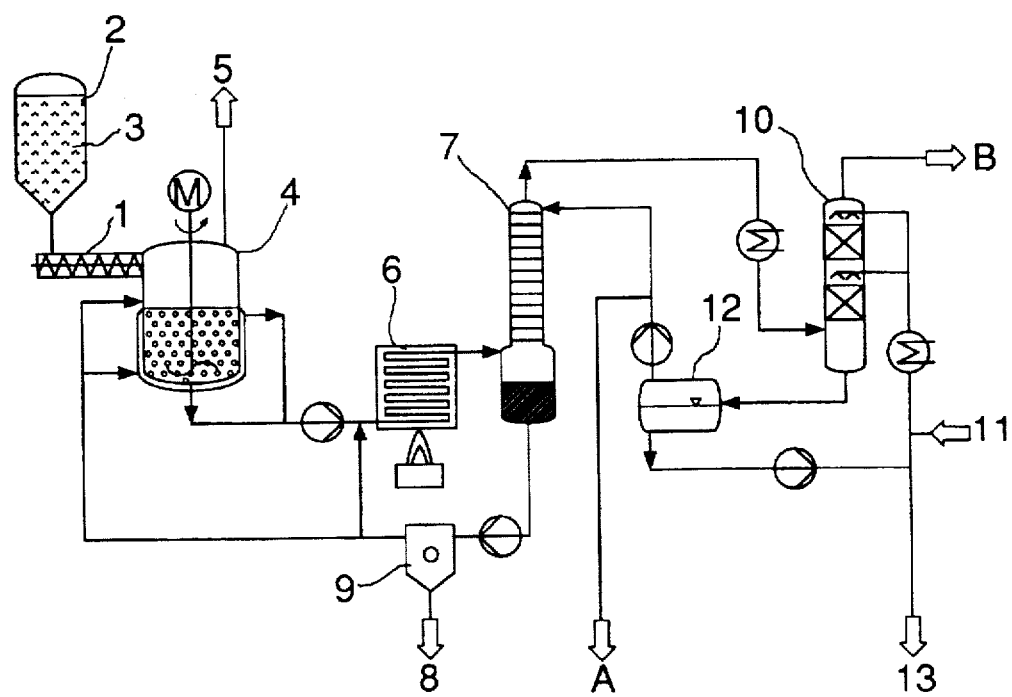
FIG. 1 is a scematic drawing of the simplified process for carrying out the present invention.

The process according to the invention is described in detail hereinafter for the example shown in the simplified process diagram in FIG. 1.

Dry and comminuted plastic waste 2, for example a blow molded fraction, is fed via a conveyor 1, eg. a conveying screw, from a storage container 3 into a stirring container 4 which is equipped with a heating jacket. In this stirring container the plastic waste is converted at about 300° C. into an easily pumped melt. During this a dehydrohalogenation may take place if some PVC has inadvertently slipped through the sorting of the plastic waste. Any HCl 5 which is produced is converted with water by known processes, which are not relevant to the invention, into aqueous HCl which can be fed to other production processes or neutralized with NaOH. The above melt is fed by means of a forced circulation pump to a steam cracker 6 (called the cracker hereinafter). In this cracker the polymers are converted, without the addition of hydrogen, vapor, catalysts, solvents or diluents, into products which can be vaporized and cracked in the steam cracker in a conventional way. This involves at about 420° C. a thermal liquid cracking and, furthermore, any remaining dehydrohalogenation takes place in the cracker. The required heat is supplied from outside, for example by oil or gas heating. The liquid/vapor mixture leaving the cracker is fed directly to a column 7, for example an enriching column. The bottom product removed at about 350° C. comprises the higher boiling products which have not been converted into short-chain hydrocarbons. This is, on the one hand, returned directly to the cracker and, on the other hand, passed as heat-transfer agent through the melt in the stirring container and through the heating jacket of the stirring container and finally returned to the cracker. Residues and solids 8 are removed, for example by means of a hydrocyclone 9, from the bottom product after it has left the column. The vapor mixture leaving the top of the column at about 240° C. is fed, after a partial condensation, to another column 10, for example a packed column, at about 110° C. The liquid/gas mixture entering the packed column is washed with water or aqueous NaOH 11 in countercurrent; any HCl still present in the gas is removed as aqueous HCl or aqueous NaCl solution with the liquid mixture at the bottom. The liquid mixture emerging at the bottom (organic liquid/aqueous HCl or aqueous NaCl solution) is separated in a downstream phase separating vessel 12. The lighter organic phase is, on the one hand, removed from the process as feed material A for the steam cracker and, on the other hand, returned to the column. The heavier aqueous phase, possibly enriched with HCl or NaCl 13, is removed from the process. The HCl-free gas mixture emerging at the top of the packed column is likewise fed to the steam cracker as feed material B.

Figure 2:
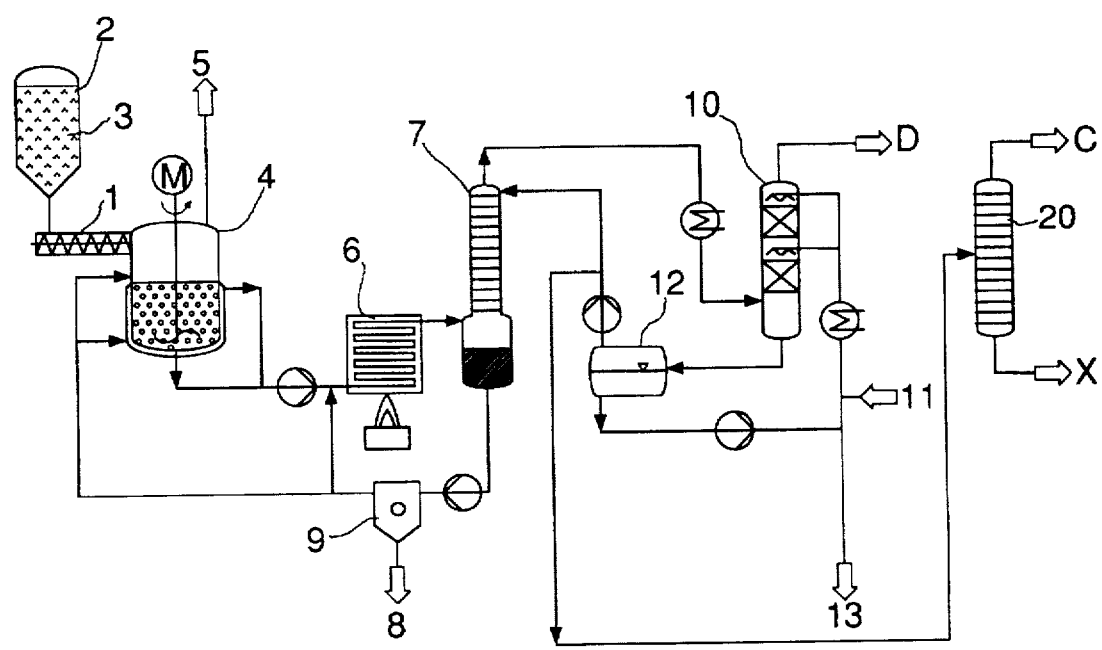
FIG. 2 is a simlified drawing which includes a modification of the process of FIG. 1.

Furthermore, FIG. 2 shows byway of example the simplified process diagram for a mixed plastic fraction: comminuted, dried plastic waste 2, for example a mixed plastic fraction, is fed via a conveyor 1, for example a conveying screw, from a storage container 3 to a stirring container 4 which is equipped with a heating jacket. In this stirring container the plastic waste is converted at about 350° C. into an easily pumped melt. During this, dehydrohalogenation to the extent of 98–99% of the chlorine content in the PVC takes place. The resulting HCl 5 is converted by water by known processes which are not relevant to the invention into aqueous HCl which can be fed to other production processes or neutralized with NaOH. The melt is fed by means of a forced circulation pump into a cracker 6. In this cracker the polymers are converted, without the addition of hydrogen, vapor, catalysts, solvents or diluents, into products which can be evaporated and cracked in the steam cracker in a conventional way. This involves at about 450° C. a thermal liquid cracking and, furthermore, the remaining dehydrohalogenation takes place in the cracker. The required heat is supplied from outside, for example by oil or gas heating. The liquid/vapor mixture leaving the cracker is directly fed to a column 7, for example an enriching column. The bottom product removed at about 380° C. comprises the higher boiling products which have not been converted into short-chain hydrocarbons. This is, on the one hand, directly returned to the cracker and, on the other hand, passed as heat-transfer agent through the melt in the stirring container and through the heating jacket of the stirring container and finally returned to the cracker. Residues and solids 8 are removed from the bottom product after it has left the column, for example by means of a hydrocyclone 9. The vapor mixture emerging at the top of the column at about 240° C. is, after a partial condensation, fed to another column 10, for example a packed column, at about 110° C. The liquid/gas mixture entering the packed column is washed with water or aqueous NaOH 11 in countercurrent; the HCl contained in the gas is removed as aqueous HCl or aqueous NaCl solution with the liquid mixture at the bottom. The liquid mixture emerging at the bottom (organic liquid/aqueous HCl or aqueous NaCl solution) is separated in a downstream phase separation vessel 12. The lighter organic phase (see Table 11) is, on the one hand, fed to a distillation or extraction unit 20 suitable for removing aromatics, and, on the other hand, returned to the column. The heavier aqueous phase, enriched in HCl or NaCl 13, is removed from the process. The HCl-free gas mixture emerging at the top of the packed column is fed as feed material D to the steam cracker. The organic liquid fed to the above distillation or extraction unit is separated, on the one hand, into the feed material C for the steam cracker and, on the other hand, into an aromatic fraction X in a column 20; both fractions are removed from the process.

It is self-evident that modification of the features of the process which have been indicated by a skilled worker within the scope of conventional technology does not change the fundamental inventiveness.

The feed materials obtained can be evaporated and cracked in the conventional way in the steam cracker.

The novel process has, inter alia, the advantage that, when the safecracker is operated with the desired product obtained from the plastic waste, heat energy can be saved compared with naphtha as the feed material. It manages without the addition of hydrogen, diluents or solvents and operates virtually at atmospheric pressure. Furthermore, the process has the advantage that the steam cracker is supplied with feed materials which can be evaporated without leaving a residue.

In some cases, it has proven advantageous to produce synthesis gas from the removed residues and solids 8 by conventional gasification by a known process, such as the Shell or Texaco process (eg. Ullmanns Encyklopädie der technischen Chemie, 4th edition, Volume 14, pages 395 to 397), for example in a cyclone gasifier. The slag obtained can be deposited in a landfill or used as building material.

The aromatics obtained from the distillation or extraction unit 20, which in itself is not relevant to the invention, can frequently be further processed. These are in general a mixture of styrene, ethyl benzene, toluene and benzene as the main components. They can be used as raw material, for example in conventional plants for the conversion of ethyl benzene into styrene, as described in Ullmanns Encyklop ädie der technischen Chemie, 4th edition, Volume 22, pages 293 to 309. Furthermore, after hydrogenation of the double bonds, they can be used in aromatics plants in which essentially benzene is prepared from a mixture of benzene, toluene and xylene (Ullmanns Encyklopädie der technischen Chemie, 4th edition, Volume 8, pages 383 to 411).

EXAMPLE 1

A blow molded fraction which is obtained from Duales System Deutschland GmbH, Bonn, Germany, and whose plastic content essentially consists of polyethylene and polypropylene, including any adherent soiling, sticky label materials, fillers, residual contents, etc., is processed in the plant of FIG. 1, described above. The resulting feed materials A (liquid mixture) and B (gas mixture) for the steam cracker have the compositions shown in Tables 1 and 2.

The cracked products obtainable thereby from the steam cracking process have the compositions shown in Tables 3 and 4. For comparison, the compositions of the cracked products if the steam cracker is operated with the traditional feed material naphtha are shown in these last two tables. Comparison shows that the yield of ethylene and propylene is higher if the steam cracker is operated with the feed materials obtained from the blow molded fraction than if the steam cracker is operated with naphtha. The results of the conversion of the blow molded fraction of the plastic waste are as follows:

| | |
|---|---|
| organic liquid mixture = feed material A for steam cracker | = 74.0% by wt. |
| HCl-free gas mixture = feed material B for steam cracker | = 16.0% by wt. |
| residues (organic high-boiling hydrocarbons) | = 2.5% by wt. |
| solids (residues on ignition) | = 7.5% by wt. |
| | 100.0% by wt. |
| and thus the organic content = 92.5% by weight. | |

EXAMPLE 2

A mixed plastic fraction which is obtained from Duales System Deutschland GmbH, Bonn, and whose plastic content essentially consists of polyethylene, polypropylene, styrene polymer and polyvinyl chloride, including any adherent soiling, sticky label materials, fillers, residual contents, etc., is processed in the plant of FIG. 2, described above. The resulting feed materials C (liquid mixture) and D (gas mixture) for the steam cracker have the compositions shown in Tables 12 and 13.

The cracked products obtainable thereby from the steam cracking process have the compositions as shown in Tables 14 and 15.

The results of the conversion of the mixed plastic fraction of the plastic waste were as follows.

| | |
|---|---|
| organic liquid mixture = feed material C for steam cracker | = 34.2% by wt. |
| HCl-free mixture = feed material D for steam cracker | = 21.8% by wt. |
| aromatic fraction, mainly ethylbenzene and styrene | = 25.8% by wt. |
| residues (high-boiling hydrocarbons) | = 12.0% by wt. |

| -continued | |
|---|---|
| solids (residues on ignition) | = 5.0% by wt. |
| | = 1.2% by wt. |
| | 100.0% by wt. |
| and thus the organic content = 93.8% by weight. | |

The following abbreviations are used in the tables hereinafter: HC=hydrocarbons, NA=non-aromatics, EB=ethylbenzene

TABLE 1

Blow molded fraction
Feed material A = liquid mixture for the steam cracker, obtained from the process according to the invention

| Composition | [% by wt.] |
|---|---|
| $C_3$ HC | 0.01 |
| 1-butene | 0.05 |
| other butenes | 0.04 |
| n-butane | 0.04 |
| 1-pentene | 0.20 |
| other pentenes | 0.16 |
| i-pentane | 0.01 |
| n-pentane | 0.32 |
| further $C_6$ HC | 0.48 |
| methylcyclopentene | 0.12 |
| 1-hexene | 1.79 |
| methylcyclopentane | 0.07 |
| other hexenes | 0.24 |
| n-hexane | 1.08 |
| methylcyclohexene | 0.84 |
| other $C_7$ HC | 0.86 |
| 1-heptene | 2.50 |
| methylcyclohexane | 0.33 |
| n-heptane | 2.34 |
| 1-octene | 2.59 |
| other $C_8$ HC | 2.59 |
| n-octane | 2.63 |
| 1-nonene | 3.59 |
| other $C_9$ HC | 3.42 |
| n-nonane | 3.02 |
| other $C_{10}$ HC | 1.40 |
| 1-decene | 3.96 |
| n-decane | 3.34 |
| 1-undecene | 3.48 |
| other $C_{11}$ HC | 1.45 |
| n-undecane | 2.88 |
| 1-dodecene | 3.45 |
| other $C_{12}$ HC | 1.75 |
| n-dodecane | 3.41 |
| 1-tridecene | 3.56 |
| other $C_{13}$ HC | 2.04 |
| n-tridecane | 3.73 |
| other $C_{14}$ HC | 2.16 |
| 1-tetradecene | 3.61 |
| n-tetradecane | 3.64 |
| other $C_{15}$ HC | 1.45 |
| 1-pentadecene | 3.33 |
| n-pentadecane | 3.58 |
| other $C_{16}$ HC | 1.23 |
| 1-hexadecene | 2.76 |
| n-hexadecane | 3.58 |
| other $C_{17}$ HC | 0.73 |
| 1-heptadecene | 2.18 |
| n-heptadecane | 3.43 |
| other $C_{18}$ HC | 0.17 |
| 1-octadecene | 1.24 |
| n-octadecane | 3.07 |
| total | 100.00 |

TABLE 2

Blow molded fraction
Feed material B = gas mixture for the steam cracker, obtained from the process according to the invention

| Composition | [% by wt.] |
|---|---|
| $H_2$ | 0.22 |
| $CH_4$ | 3.65 |
| $C_2H_6$ | 8.89 |
| $C_2H_4$ | 2.76 |
| $C_3H_8$ | 13.16 |
| $C_3H_6$ | 13.78 |
| $i\text{-}C_4H_{10}$ | 0.22 |
| $n\text{-}C_4H_{10}$ | 9.31 |
| $1\text{-}C_4H_8$ | 7.83 |
| $i\text{-}C_4H_8$ | 3.14 |
| $2\text{-}C_4H_8 t$ | 1.80 |
| $2\text{-}C_4H_8 c$ | 1.31 |
| $C_4H_6$ | 0.93 |
| $i\text{-}C_5H_{12}$ | 0.47 |
| $n\text{-}C_5H_{12}$ | 11.51 |
| $C_5H_{10}$ | 10.60 |
| benzene | 0.71 |
| $C_6H_{12}$ | 9.71 |
| total | 100.00 |

TABLE 3

Blow molded fraction
Cracked product from the steam cracker
I) with feed material A from the process according to the invention
II) with naphtha as feed material

| Composition | [% by wt.] I | [% by wt.] II |
|---|---|---|
| CO | 0.1 | 0.2 |
| $H_2$ | 0.7 | 1.0 |
| $CH_4$ | 10.7 | 14.6 |
| $C_2H_6$ | 3.6 | 3.1 |
| $C_2H_4$ | 33.1 | 29.9 |
| $C_2H_2$ | 0.4 | 0.5 |
| $C_3H_8$ | 0.4 | 0.4 |
| $C_3H_6$ | 16.8 | 15.2 |
| propyne | 0.2 | 0.3 |
| propadiene | 0.3 | 0.4 |
| $i\text{-}C_4H_{10}$ | 0.0 | 0.0 |
| $n\text{-}C_4H_{10}$ | 0.1 | 0.2 |
| 1-butene | 2.1 | 1.4 |
| i-butene | 0.7 | 2.1 |
| 2-butene (c) | 0.5 | 0.5 |
| 2-butene (t) | 0.4 | 0.3 |
| $C_4H_6$ | 7.2 | 4.9 |
| $C_5$ HC | 5.2 | 4.5 |
| $C_6\text{-}C_8$ NA | 1.8 | 2.1 |
| benzene | 7.8 | 7.9 |
| toluene | 2.9 | 3.5 |
| EB + xylenes | 0.6 | 1.1 |
| styrene | 0.8 | 1.0 |
| $C_9$ HC | 0.7 | 0.9 |
| $C_{10}+$ HC | 3.0 | 4.0 |
| total | 100.0 | 100.0 |

TABLE 4

Blow molded fraction
Cracked product (gas mixture) from the steam cracker
I) with feed material B from the process according to the invention
II) with naphtha as feed material

| Composition | [% by wt.] I | [% by wt.] II |
|---|---|---|
| CO | 0.2 | 0.2 |
| $H_2$ | 1.0 | 1.0 |
| $CH_4$ | 16.8 | 14.6 |
| $C_2H_6$ | 6.5 | 3.1 |
| $C_2H_4$ | 31.8 | 29.9 |
| $C_2H_2$ | 0.7 | 0.5 |
| $C_3H_8$ | 3.2 | 0.4 |
| $C_3H_6$ | 16.1 | 15.2 |
| propyne | 0.3 | 0.3 |
| propadiene | 0.5 | 0.4 |
| $i\text{-}C_4H_{10}$ | 0.0 | 0.0 |
| $n\text{-}C_4H_{10}$ | 1.0 | 0.2 |
| 1-butene | 1.0 | 1.4 |
| i-butene | 0.9 | 2.1 |
| 2-butene (c) | 0.4 | 0.5 |
| 2-butene (t) | 0.3 | 0.3 |
| $C_4H_6$ | 4.9 | 4.9 |
| $C_5$ HC | 2.6 | 4.5 |
| $C_6\text{-}C_8$ NA | 0.5 | 2.1 |
| benzene | 6.0 | 7.9 |
| toluene | 1.7 | 3.5 |
| EB + xylenes | 0.3 | 1.1 |
| styrene | 0.6 | 1.0 |
| $C_9$ HC | 0.3 | 0.9 |
| $C_{10}+$ HC | 2.3 | 4.0 |
| total | 100.0 | 100.0 |

TABLE 11

Mixed plastic fraction
Feed material for the distillation or extraction unit for removing the aromatic fraction, obtained from the process according to the invention

| Composition | [% by wt.] |
|---|---|
| $C_2$ HC | <0.01 |
| $C_3$ HC | 0.14 |
| n-butane | 0.05 |
| 1-butene | 0.21 |
| other butenes | 0.05 |
| i-pentane | 0.02 |
| n-pentane | 1.45 |
| 1-pentene | 0.24 |
| other pentenes | 0.36 |
| n-hexane | 0.57 |
| 1-hexene | 2.22 |
| other hexenes | 0.81 |
| methylcyclopentane | 0.12 |
| methylcyclopentene | 0.13 |
| other $C_6$ HC | 0.95 |
| benzene | 2.93 |
| n-heptane | 1.03 |
| 1-heptene | 1.15 |
| methylcyclohexane | 0.09 |
| methylcyclohexene | 0.94 |
| other $C_7$ HC | 1.42 |
| toluene | 6.72 |
| n-octane | 1.02 |
| 1-octene | 1.43 |
| ethylcyclohexane | 5.56 |
| ethylbenzene | 8.84 |
| para-xylene | 0.27 |
| meta-xylene | 0.20 |

TABLE 11-continued

Mixed plastic fraction
Feed material for the distillation or extaction unit for removing the aromatic fraction, obtained from the process according to the invention

| Composition | [% by wt.] |
|---|---|
| ortho-xylene | 0.36 |
| styrene | 9.64 |
| other $C_8$ HC | 1.37 |
| n-nonane | 1.83 |
| 1-nonene | 1.45 |
| i-propylbenzene | 1.58 |
| n-propylbenzene | 0.40 |
| other $C_9$ HC | 4.43 |
| n-decane | 1.92 |
| 1-decene | 1.60 |
| other $C_{10}$ HC | 1.65 |
| n-undecane | 1.29 |
| 1-undecene | 1.36 |
| other $C_{11}$ HC | 3.43 |
| n-dodecane | 1.41 |
| 1-dodecene | 1.34 |
| other $C_{12}$ HC | 3.93 |
| n-tridecane | 1.46 |
| 1-tridecene | 1.53 |
| other $C_{13}$ HC | 4.05 |
| n-tetradecane | 1.43 |
| 1-tetradecene | 1.31 |
| other $C_{14}$ HC | 2.69 |
| n-pentadecane | 1.40 |
| 1-pentadecene | 0.78 |
| other $C_{15}$ HC | 1.61 |
| n-hexadecane | 1.44 |
| 1-hexadecene | 0.59 |
| other $C_{16}$ HC | 0.88 |
| n-heptadecane | 1.32 |
| 1-heptadecene | 0.28 |
| other $C_{17}$ HC | 0.15 |
| n-octadecane | 1.05 |
| 1-octadecene | 0.03 |
| other $C_{18}$ HC | 0.09 |
| n-nonadecane | |
| 1-nonadecene | |
| other $C_{19}$ HC | |
| total | 100.00 |

TABLE 12

Mixed plastic fraction
Feed Material C for the steam cracker, obtained from the process according to the invention and the distillation or extraction unit for removing the aromatics

| Composition | [% by wt.] |
|---|---|
| $C_2$ HC | 0.02 |
| $C_3$ HC | 0.25 |
| n-butane | 0.10 |
| 1-butene | 0.37 |
| other butenes | 0.10 |
| i-pentane | 0.04 |
| n-pentane | 2.54 |
| 1-pentene | 0.42 |
| other pentenes | 0.63 |
| n-hexane | 1.00 |
| 1-hexene | 3.89 |
| other hexenes | 1.40 |
| methylcyclopentane | 0.19 |
| methylcyclopentene | 0.21 |
| other $C_6$ HC | 1.53 |
| benzene | 5.11 |
| n-heptane | 1.42 |
| 1-heptene | 1.76 |

TABLE 12-continued

Mixed plastic fraction
Feed Material C for the steam cracker, obtained from the process according to the invention and the distillation or extraction unit for removing the aromatics

| Composition | [% by wt.] |
|---|---|
| methylcyclohexane | 0.09 |
| methylcyclohexene | 0.96 |
| other $C_7$ HC | 1.46 |
| toluene | 1.99 |
| n-octane | 0.02 |
| 1-octene | 0.04 |
| ethylcyclohexane | 5.70 |
| ethylbenzene | 0.09 |
| para-xylene | <0.01 |
| meta-xylene | <0.01 |
| ortho-xylene | 0.01 |
| styrene | 0.18 |
| other $C_8$ HC | 0.01 |
| n-nonane | 0.11 |
| 1-nonene | 0.06 |
| i-propylbenzene | 0.09 |
| n-propylbenzene | 0.05 |
| other $C_9$ HC | 3.55 |
| n-decane | 1.54 |
| 1-decene | 0.98 |
| other $C_{10}$ HC | 1.01 |
| n-undecane | 2.20 |
| 1-undecene | 2.40 |
| other $C_{11}$ HC | 5.90 |
| n-dodecane | 2.50 |
| 1-dodecene | 2.30 |
| other $C_{12}$ HC | 6.90 |
| n-tridecane | 2.55 |
| 1-tridecene | 2.67 |
| other $C_{13}$ HC | 7.08 |
| n-tetradecane | 2.53 |
| 1-tetradecene | 2.31 |
| other $C_{14}$ HC | 4.76 |
| n-pentadecane | 2.47 |
| 1-pentadecene | 1.38 |
| other $C_{15}$ HC | 2.85 |
| n-hexadecane | 2.52 |
| 1-hexadecene | 1.04 |
| other $C_{16}$ HC | 1.54 |
| n-heptadecane | 2.34 |
| 1-heptadecene | 0.50 |
| other $C_{17}$ HC | 0.26 |
| n-octadecane | 1.82 |
| 1-octadecene | 0.05 |
| other $C_{18}$ HC | 0.16 |
| n-nonadecane | 0.03 |
| 1-nonadecene | |
| other $C_{19}$ HC | |
| total | 100.00 |

TABLE 13

Mixed plastic fraction
Feed material D = gas mixture for the steam cracker, obtained from the process according to the invention

| Composition | [% by wt.] |
|---|---|
| $H_2$ | 1.32 |
| $CH_4$ | 8.29 |
| $C_2H_6$ | 8.94 |
| $C_2H_4$ | 10.40 |
| $C_3H_8$ | 6.95 |
| $C_3H_6$ | 20.49 |
| i-$C_4H_{10}$ | 0.28 |
| n-$C_4H_{10}$ | 2.25 |
| 1-$C_4H_8$ | 4.27 |
| i-$C_4H_8$ | 6.77 |

TABLE 13-continued

Mixed plastic fraction
Feed material D = gas mixture for the steam cracker, obtained from the process according to the invention

| Composition | [% by wt.] |
| --- | --- |
| 2-$C_4H_8$t | 1.65 |
| 2-$C_4H_8$c | 2.32 |
| $C_4H_6$ | 1.20 |
| i-$C_5H_{12}$ | 0.18 |
| n-$C_5H_{12}$ | 10.62 |
| $C_5H_{10}$ | 7.51 |
| benzene | 1.06 |
| $C_6H_{12}$ | 5.50 |
| total | 100.00 |

TABLE 14

Mixed plastic fraction
Cracked product from the steam cracker with feed material C from the process according to the invention

| Composition | [% by wt.] |
| --- | --- |
| CO | 0.1 |
| $H_2$ | 0.8 |
| $CH_4$ | 11.1 |
| $C_2H_6$ | 3.0 |
| $C_2H_4$ | 27.2 |
| $C_2H_2$ | 0.4 |
| $C_3H_8$ | 0.5 |
| $C_3H_6$ | 13.8 |
| propyne | 0.2 |
| propadiene | 0.3 |
| i-$C_4H_{10}$ | 0 |
| n-$C_4H_{10}$ | 0.1 |
| 1-butene | 1.5 |
| i-butene | 1.3 |
| 2-butene (c) | 0.5 |
| 2-butene (t) | 0.3 |
| $C_4H_6$ | 5.8 |
| $C_5$ HC | 4.9 |
| $C_6$–$C_8$ NA | 1.7 |
| benzene | 12.2 |
| toluene | 5.0 |
| EB + xylenes | 1.0 |
| styrene | 1.5 |
| $C_9$ HC | 1.2 |
| $C_{10}$+ HC | 5.5 |
| total | 100.0 |

TABLE 15

Mixed plastic fraction
Cracked product from the steam cracker with feed material D from the process according to the invention

| Composition | [% by wt.] |
| --- | --- |
| CO | 0.2 |
| $H_2$ | 1.7 |
| $CH_4$ | 19.3 |
| $C_2H_6$ | 6.7 |
| $C_2H_4$ | 31.8 |
| $C_2H_2$ | 0.7 |
| $C_3H_8$ | 2.1 |
| $C_3H_6$ | 16.1 |
| propyne | 0.4 |
| propadiene | 0.6 |
| i-$C_4H_{10}$ | 0.1 |
| n-$C_4H_{10}$ | 0.3 |
| 1-butene | 0.9 |

TABLE 15-continued

Mixed plastic fraction
Cracked product from the steam cracker with feed material D from the process according to the invention

| Composition | [% by wt.] |
| --- | --- |
| i-butene | 2.0 |
| 2-butene (c) | 0.4 |
| 2-butene (t) | 0.3 |
| 1,3-$C_4H_6$ + VA | 4.5 |
| $C_5$ HC | 2.6 |
| $C_6$–$C_8$ NA | 0.5 |
| benzene | 5.1 |
| toluene | 1.4 |
| EB + xylenes | 0.2 |
| styrene | 0.5 |
| $C_9$ HC | 0.2 |
| $C_{10}$+ HC | 1.5 |
| total | 100.0 |

We claim:

1. A process for recycling plastic waste in a steam cracker, wherein a melt obtained from heating plastic waste is converted into steam cracker feed products by heating the melt at from 400° to 550° C. and a distillate fraction separated from said products at from 180° to 280° C. is fed to a steam cracker.

2. A process as defined in claim 1, wherein the plastic waste is melted.

the melt is fed to a reactor where the polymers are converted into products at from 400° to 550° C., a distillate fraction is separated by distillation at from 200° to 280° C. from the products, the other products are returned to the reactor, with the exception of residues and solids and any inorganic acids, and the distillate fraction separated off is introduced, optionally after further separation, as a feed material into the steam cracker.

3. A process as defined in claim 1, wherein the distillate fraction is separated by distillation from the products by a process in which the products are separated by means of a 1st column which is directly downstream of the reactor, and into a bottom product resulting at from 300° to 420° C., which, after removal of the residues and solids, is returned to the tubular furnace, and into a top product resulting at from 200° to 280° C., which, after partial condensation, is fed to a 2nd column at from 70° to 150° C., the liquid/gas mixture resulting after the partial condensation is separated by means of the above 2nd column into a liquid mixture emerging at the bottom of the 2nd column, which is, in part returned to the 1st column, and, in part, used as feed material for the steam cracker, and into a gas mixture emerging at the top of the 2nd column, which is used as feed material for the steam cracker.

4. A process for recycling chlorine-containing and/or aromatics-containing plastic waste in a steam cracker as defined in claim 1, wherein the plastic waste is melted at from 280° to 380° C. with dehydrohalogenation of the chlorine-containing plastic, the melt is fed into a reactor where the polymers are converted at from 410° to 530° C. into products, the above products are separated by means of a 1st column which is directly downstream of the reactor into
- a bottom product resulting at from 330° to 450° C., which, after removal of the residues and solids, is returned to the reactor, and into
- a top product resulting at from 200° to 280° C., which, after partial condensation, is fed to a 2nd column at from 70° to 150° C., the liquid/gas mixture resulting after the partial condensation is separated by means of the above 2nd column, into
- a liquid mixture emerging at the bottom of the 2nd column, which is, in part, returned to the 1st column and, in part, fed to a distillation or extraction unit suitable for removing aromatics, and into
- a gas mixture emerging at the top of the 2nd column, which is used as feed material for the steam cracker.

5. A process as defined in claim 4, wherein the liquid mixture fed to the distillation or extraction unit is separated into
- a liquid fraction which is used as feed material for the steam cracker, and into
- an aromatic fraction.

6. A process as defined in claim 1, wherein the plastic waste employed comprises a blow molded fraction consisting of bottles and containers composed essentially of polyolefins, optionally with adherent soiling, sticky label materials, fillers and residual contents.

7. A process as defined in claim 1, wherein the plastic waste comprises a mixed plastic fraction composed essentially of polyolefins, polystyrene and polyvinyl chloride, optionally with adherent soiling, sticky label materials, fillers and residual contents.

8. A process as defined in claim 1, wherein the plastic waste employed comprises a sheet fraction composed essentially of polyethylene, polypropylene, including optional soiling, sticky label materials, filler and residual contents.

9. A process as defined in claim 1, wherein the plastic waste employed comprises a light fraction consisting essentially of polyethylene, polypropylene and polystyrene, including optional soiling, sticky label materials, fillers, residual contents.

* * * * *

UNITED STATES PATENT AND TRADEMARK OFFICE
CERTIFICATE OF CORRECTION

PATENT NO.: 5,731,483

DATED: March 24, 1998

INVENTOR(S): STABEL et al.

It is certified that error appears in the above-identified patent and that said Letters Patent is hereby corrected as shown below:

On the cover page, in the abstract, item [57], line 3, "400°C 550°" should read --400° to 550°--.

Column 16, claim 9, line 20, "fillers, residual" should be --fillers, and residual--.

Signed and Sealed this

Nineteenth Day of May, 1998

Attest:

BRUCE LEHMAN

*Attesting Officer*  *Commissioner of Patents and Trademarks*